(12) United States Patent
Schepis et al.

(10) Patent No.: US 8,281,361 B1
(45) Date of Patent: Oct. 2, 2012

(54) METHODS AND SYSTEMS FOR ENFORCING PARENTAL-CONTROL POLICIES ON USER-GENERATED CONTENT

(75) Inventors: Adam Schepis, Milford, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 470 days.

(21) Appl. No.: 12/411,899

(22) Filed: Mar. 26, 2009

(51) Int. Cl.
| | |
|---|---|
| *G06F 17/00* | (2006.01) |
| *G06F 7/04* | (2006.01) |
| *G06F 15/16* | (2006.01) |
| *G06F 17/30* | (2006.01) |
| *G06F 3/00* | (2006.01) |
| *G06F 11/00* | (2006.01) |
| *G06F 12/14* | (2006.01) |
| *G06F 12/16* | (2006.01) |
| *G06F 9/00* | (2006.01) |
| *G06F 7/00* | (2006.01) |
| *G06F 15/173* | (2006.01) |
| *H04N 7/16* | (2006.01) |
| *G08B 23/00* | (2006.01) |
| *G06Q 30/00* | (2006.01) |

(52) U.S. Cl. .......... 726/1; 707/602; 726/4; 726/23; 726/25; 726/11; 709/225; 705/26.35; 705/14.6; 725/28; 715/738; 715/765

(58) Field of Classification Search .......... 726/1
See application file for complete search history.

(56) References Cited

U.S. PATENT DOCUMENTS

| | | | | |
|---|---|---|---|---|
| 5,550,575 | A * | 8/1996 | West et al. | 725/28 |
| 5,678,041 | A * | 10/1997 | Baker et al. | 1/1 |
| 5,706,507 | A * | 1/1998 | Schloss | 709/225 |
| 5,835,722 | A * | 11/1998 | Bradshaw et al. | 709/225 |
| 5,911,043 | A * | 6/1999 | Duffy et al. | 709/203 |
| 5,996,011 | A * | 11/1999 | Humes | 709/225 |
| 6,260,064 | B1 * | 7/2001 | Kurzrok | 709/224 |
| 6,295,559 | B1 * | 9/2001 | Emens et al. | 709/225 |
| 6,493,744 | B1 * | 12/2002 | Emens et al. | 709/203 |
| 6,606,659 | B1 * | 8/2003 | Hegli et al. | 709/225 |
| 7,209,957 | B2 * | 4/2007 | Patron et al. | 709/208 |
| 7,305,624 | B1 * | 12/2007 | Siegel | 715/738 |
| 7,310,641 | B2 * | 12/2007 | Moore et al. | 1/1 |
| 7,421,498 | B2 * | 9/2008 | Packer | 709/225 |
| 7,444,403 | B1 * | 10/2008 | Packer et al. | 709/224 |
| 7,562,304 | B2 * | 7/2009 | Dixon et al. | 715/738 |

(Continued)

OTHER PUBLICATIONS

"Content Filtering Internet Proxy"; (accessed May 14, 2009); www.safesquid.com.

*Primary Examiner* — Carolyn B Kosowski
(74) *Attorney, Agent, or Firm* — Advantedge Law Group (57) ABSTRACT

A method for enforcing parental-control policies on user-generated content may include identifying a web document with user-generated content and identifying a set of links in the web document that relate to the user-generated content in the web document. The method may also include identifying a target web document for each link in the set of links and determining a parental-control rating for each link in the set of links based on the target web document. The method may further include generating a composite rating of the web document based on the parental-control rating of each link in the set of links. Various other methods, systems, and computer-readable-storage media are also disclosed.

15 Claims, 7 Drawing Sheets

U.S. PATENT DOCUMENTS

| | | | |
|---|---|---|---|
| 7,565,350 B2 * | 7/2009 | Fetterly et al. | 1/1 |
| 7,565,358 B2 * | 7/2009 | Minogue et al. | 1/1 |
| 7,590,707 B2 * | 9/2009 | McCloy et al. | 709/217 |
| 7,617,090 B2 * | 11/2009 | Wang et al. | 704/9 |
| 7,650,420 B2 * | 1/2010 | Chong et al. | 709/229 |
| 7,703,030 B2 * | 4/2010 | Smirin et al. | 715/765 |
| 7,739,253 B1 * | 6/2010 | Yanovsky et al. | 707/705 |
| 7,761,566 B2 * | 7/2010 | Adelman et al. | 709/224 |
| 7,831,536 B2 * | 11/2010 | Ghosh et al. | 706/46 |
| 7,831,926 B2 * | 11/2010 | Rohrabaugh et al. | 715/800 |
| 7,953,079 B2 * | 5/2011 | John et al. | 370/389 |
| 7,966,553 B2 * | 6/2011 | Iverson | 715/205 |
| 2003/0009495 A1 * | 1/2003 | Adjaoute | 707/501.1 |
| 2003/0182420 A1 * | 9/2003 | Jones et al. | 709/224 |
| 2003/0225763 A1 * | 12/2003 | Guilak et al. | 707/7 |
| 2005/0022234 A1 * | 1/2005 | Strothman et al. | 725/34 |
| 2005/0060404 A1 * | 3/2005 | Ahlander et al. | 709/224 |
| 2005/0081043 A1 * | 4/2005 | Evans et al. | 713/182 |
| 2006/0242306 A1 * | 10/2006 | Boro et al. | 709/227 |
| 2006/0253578 A1 * | 11/2006 | Dixon et al. | 709/225 |
| 2006/0253581 A1 * | 11/2006 | Dixon et al. | 709/225 |
| 2006/0253583 A1 * | 11/2006 | Dixon et al. | 709/225 |
| 2006/0253584 A1 * | 11/2006 | Dixon et al. | 709/225 |
| 2007/0180490 A1 * | 8/2007 | Renzi et al. | 726/1 |
| 2007/0214097 A1 * | 9/2007 | Parsons et al. | 706/12 |
| 2007/0250775 A1 * | 10/2007 | Marsico et al. | 715/716 |
| 2008/0082662 A1 * | 4/2008 | Dandliker et al. | 709/225 |
| 2008/0109244 A1 * | 5/2008 | Gupta | 705/1 |
| 2008/0109245 A1 * | 5/2008 | Gupta | 705/1 |
| 2008/0215975 A1 * | 9/2008 | Harrison et al. | 715/706 |
| 2009/0006371 A1 * | 1/2009 | Denoue et al. | 707/5 |
| 2009/0089417 A1 * | 4/2009 | Giffin et al. | 709/224 |
| 2009/0157490 A1 * | 6/2009 | Lawyer | 705/11 |
| 2009/0217342 A1 * | 8/2009 | Nadler | 726/1 |
| 2010/0042931 A1 * | 2/2010 | Dixon et al. | 715/738 |
| 2010/0333117 A1 * | 12/2010 | Culbreth et al. | 719/328 |

* cited by examiner

METHODS AND SYSTEMS FOR ENFORCING PARENTAL-CONTROL POLICIES ON USER-GENERATED CONTENT

BACKGROUND

Children increasingly access the Internet in their everyday activities and may access a variety of content from the Internet. A parent or an organization may deem some content inappropriate for a child and may wish to prevent that child from accessing such content.

If a parent deems Internet content inappropriate, the parent may use parental-control software to block a child from accessing the content. The parent may use the parental-control software to block access to a website with inappropriate content. However, blocking an entire website may be too coarse of a remedy in many cases. For example, an increasing amount of Internet content may be user-generated (e.g., blogs and social networking content). A website that hosts user-generated content may include both appropriate and inappropriate content.

Some parental-control software may help parents automatically block content on a case-by-case basis by scanning for keywords that signal inappropriate content. However, relying on keywords may produce too many false positives and too many false negatives. For example, a keyword that tends to signal inappropriate content may also have benign uses. Further, some inappropriate content may not include keywords that are helpful for identifying the content.

Websites that host user-generated content may pose a further difficulty for parents who wish to prevent their children from submitting inappropriate content. As in the case of blocking user-generated content, blocking the child's creation of content entirely may be too coarse a remedy, while blocking the child's creation of content based on keywords may be too inaccurate.

SUMMARY

As will be described in greater detail below, the instant disclosure generally relates to systems and methods for enforcing parental-control policies on user-generated content by rating web documents linked to the user-generated content and then generating a composite rating for the user-generated content. In some embodiments, a detection module may identify a web document with user-generated content, identify a set of links relating to the user-generated content, and identify a target web document for each link in the set of links. A rating module may then determine a parental-control rating for each link in the set of links, based on the target web document of the link, and generate a composite rating based on the parental-control rating for each link in the set of links.

In some embodiments, the detection module may identify the web document by detecting an attempt to access the web document and determining that the web document includes user-generated content. The detection module may determine that the web document includes user-generated content by determining that the web document is located on a website known for user-generated content (e.g., FACEBOOK.COM or BLOGGER.COM) or by determining that the web document includes a framework for user-generated content (e.g., WORDPRESS or BLOGGER).

The rating module may use a variety of ratings to generate the composite rating of the web document. For example, the rating module may generate the composite rating by determining that a link refers to a content-generating user (e.g., the link points to a user profile) and by determining that the link corresponds to content in the web document (e.g., a comment or a post). The rating module may then determine a reputation rating for the content-generating user and generate the composite rating of the web document with the reputation rating. The rating module may also generate the composite rating of the web document by identifying an incoming link that points to the web document, identifying the source of the incoming link, determining a parental-control rating for the source, and generating the composite rating of the web document with the parental-control rating for the source.

The rating module may also enforce a parental-control policy based on the composite rating. The rating module may enforce the parental-control policy by, for example, blocking access to the web document, blocking access to part of the web document (e.g., a comment, an image, a video, and/or a hyperlink), and/or by blocking an attempt to submit user-generated content to a website.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for enforcing parental-control policies on user-generated content. For example, embodiments of the present disclosure may use one or more modules to identify a web document with user-generated content, identify a set of links relating to the user-generated content, and/or identify a target web document for each link in the set of links. One or more modules may then determine a parental-control rating for each link in the set of links, based on the target web document of the link, and generate a composite rating based on the parental-control rating for each link in the set of links.

Embodiments of the present disclosure may provide various features and advantages not provided by traditional technologies. For example, methods and systems described herein may allow a parent to accurately and selectively block inappropriate user-generated content while allowing a child to access appropriate user-generated content. Additionally, some embodiments described herein may allow a parent to prevent a child from contributing inappropriate content to websites while allowing the child to participate in and contribute appropriately to websites with user-generated content. These and other embodiments, features, and advantages will be more fully understood upon reading the following detailed description in conjunction with the accompanying drawings and claims.

Figure 1:
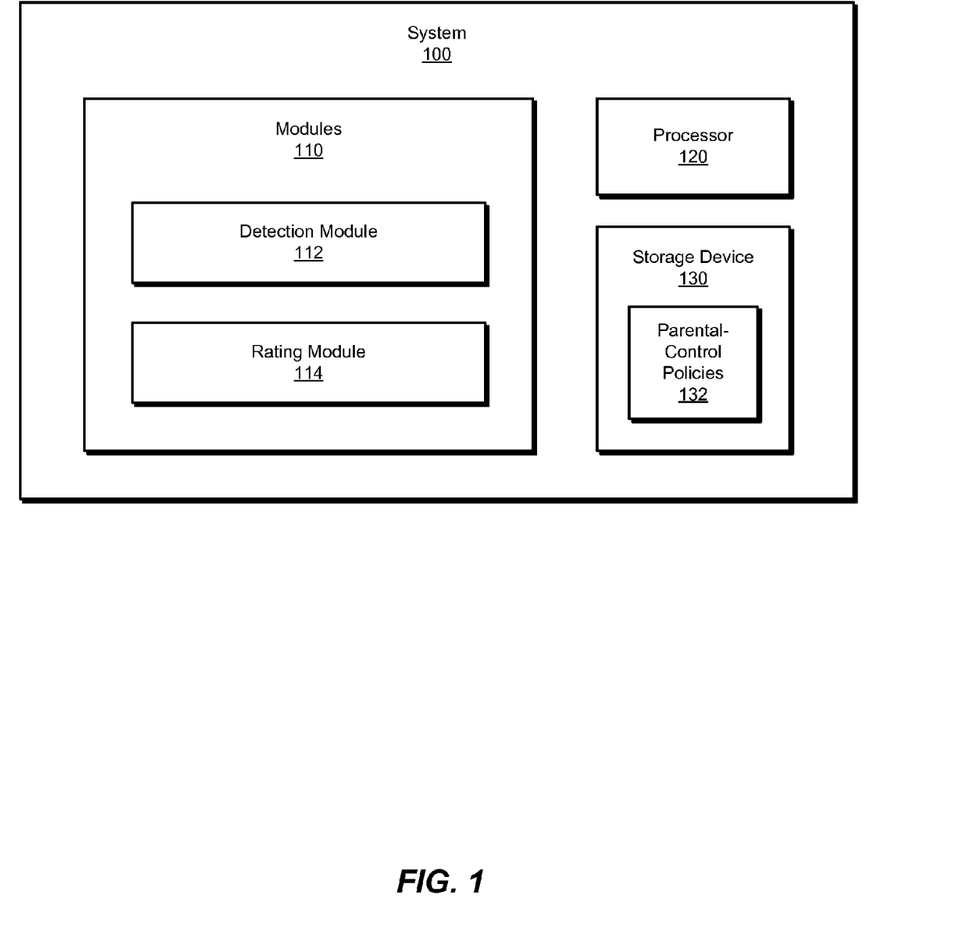
FIG. 1 is a block diagram of an exemplary system for enforcing parental-control policies on user-generated content.

FIG. 1 illustrates an exemplary system 100 for enforcing parental-control policies on user-generated content. System 100 may include modules 110. Modules 110 may include a detection module 112 and a rating module 114. System 110 may also include processor 120. Processor 120 may be configured to execute at least a portion of detection module 112 and/or rating module 114. System 110 may also include a storage device 130. Storage device 130 may include parental-control policies 132. As will be explained in greater detail below, detection module 112 may be programmed to identify a web document with user-generated content, identify a set of links in the web document that relate to the user-generated content, and, for each link in the set of links, identify a target web document. Rating module 114 may be programmed to determine, for each link in the set of links, a parental-control rating for the link based on the target web document and generate a composite rating of the web document based, at least in part, on the parental-control rating of each link in the set of links.

In certain embodiments, one or more of modules 110 in FIG. 1 may represent one or more software applications or programs that, when executed by a computing system, may cause the computing system to perform one or more of the steps disclosed herein. For example, as will be described in greater detail below, one or more of modules 110 may represent software modules configured to run on one or more computing devices, such as computing system 610 in FIG. 6 and/or portions of exemplary network architecture 700 in FIG. 7. One or more of modules 110 in FIG. 1 may also represent all or portions of one or more special-purpose computers configured to perform one or more tasks associated with the steps disclosed herein.

Figure 2:
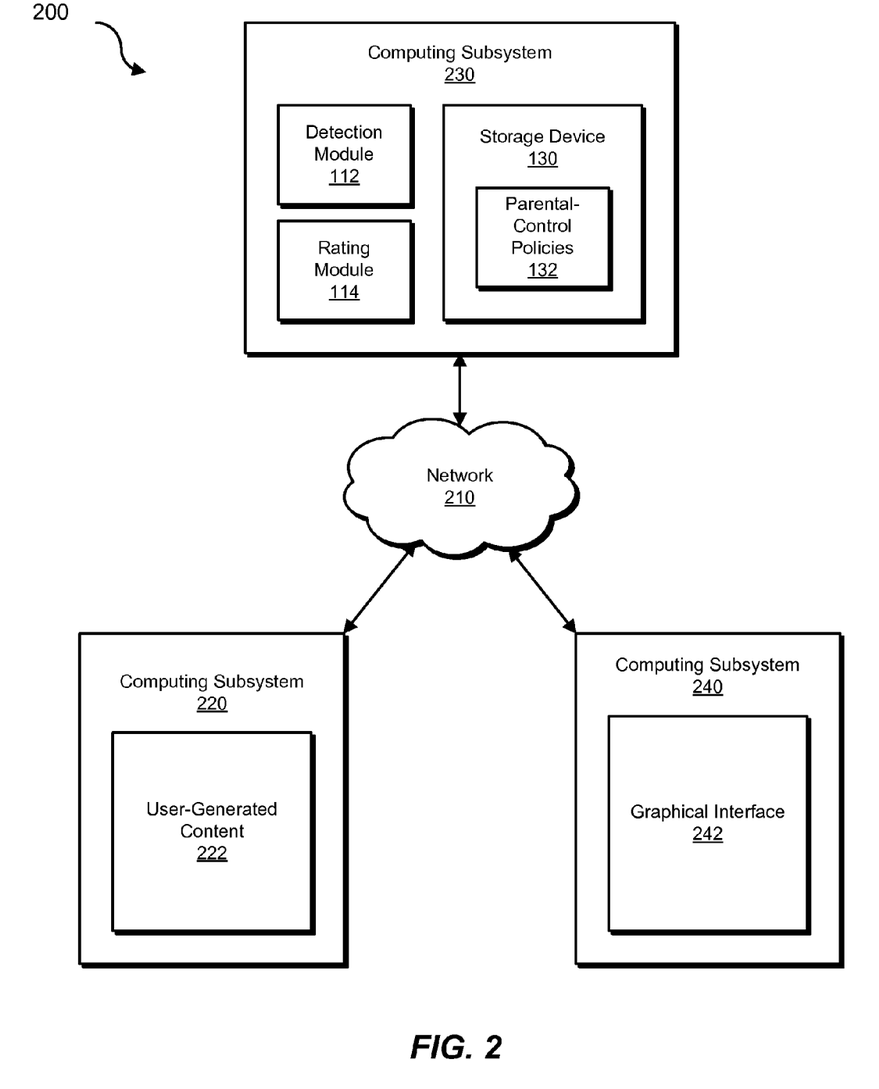
FIG. 2 is a block diagram of an exemplary computing network with computing subsystems for enforcing parental-control policies on user-generated content.

FIG. 2 is a block diagram of an exemplary system 200 having a network 210 and computing subsystems 220, 230, and 240 for enforcing parental-control policies on user-generated content. Computing subsystem 220, 230, and/or 240 generally represent any type or form of computing device capable of reading computer-executable instructions. Examples of computing subsystems 220, 230, and/or 240 may include, without limitation, laptops, desktops, servers, cellular phones, personal digital assistants (PDAs), multimedia players, embedded systems, combinations of one or more of the same, exemplary computing system 610 in FIG. 6, or any other suitable computing device. Computing subsystem 220 may include user-generated content 222, and computing subsystem 230 may include detection module 112 of FIG. 1, rating module 114 of FIG. 1, and storage device 130 of FIG. 1. Storage device 130 may include parental-control-policies 132 of FIG. 1. Computing subsystem 240 may include a graphical interface 242.

Network 210 may include a wide area network (WAN), such as the Internet, or any other network that may provide access to user-generated content. Network 210 may additionally include a local area network (LAN) that connects computing system 230 with computing system 240. Network 210 may additionally or alternatively include any other suitable network technology.

Computing subsystem 220 may include a server that hosts a website. As used herein, a "website" may refer to any collection of cross-referencing or interrelated electronic files available for access across a network. The website may include user-generated content 222. As used herein, "user-generated content" may refer to content in a wider collection of content that cannot be entirely attributed to a single author, content that is not entirely authored by the entity that publishes or hosts it, and/or content that may be evaluated for appropriateness by evaluating content to which it links or refers.

Computing subsystem 230 may include an end-user computing device accessible by a child. As used herein, a "child" may refer to a minor, a dependent, and/or any person subject to content-control policies. Parental-control policies 132 may include content-control policies for enforcement on the child. As used herein, a "parental-control policy" may refer to any content-control policy.

Computing subsystem 240 may include an end-user computing device accessible by a parent. As used herein, a "parent" may refer to any parent, guardian, adult, and/or organization that may apply a parental-control policy to a child. Graphical interface 242 may allow the parent to monitor attempted violations of parent-control policies, view or modify parental-control policies, and/or enforce parental-control policies.

By way of example, a child may operate computing subsystem 230 in an attempt to access user-generated content 222 on computing subsystem 220 through network 210. At least one of modules 110 may access parental-control policies 132 through storage device 130 in order to determine whether to allow the child's access attempt. One or more of modules 110 may perform steps, which are described in greater detail below, to determine how to respond to the child's access attempt. A parent may operate computing system 240 and, through graphical interface 242, observe the access attempt and/or modify a parental-control policy. In other embodiments, graphical interface 242 may be located on computing subsystem 230 (i.e., the same computing system that a child may use). In such embodiments, the parent may administer parental-control policies from the same computing device the child may use to access user-generated content.

Figure 3:
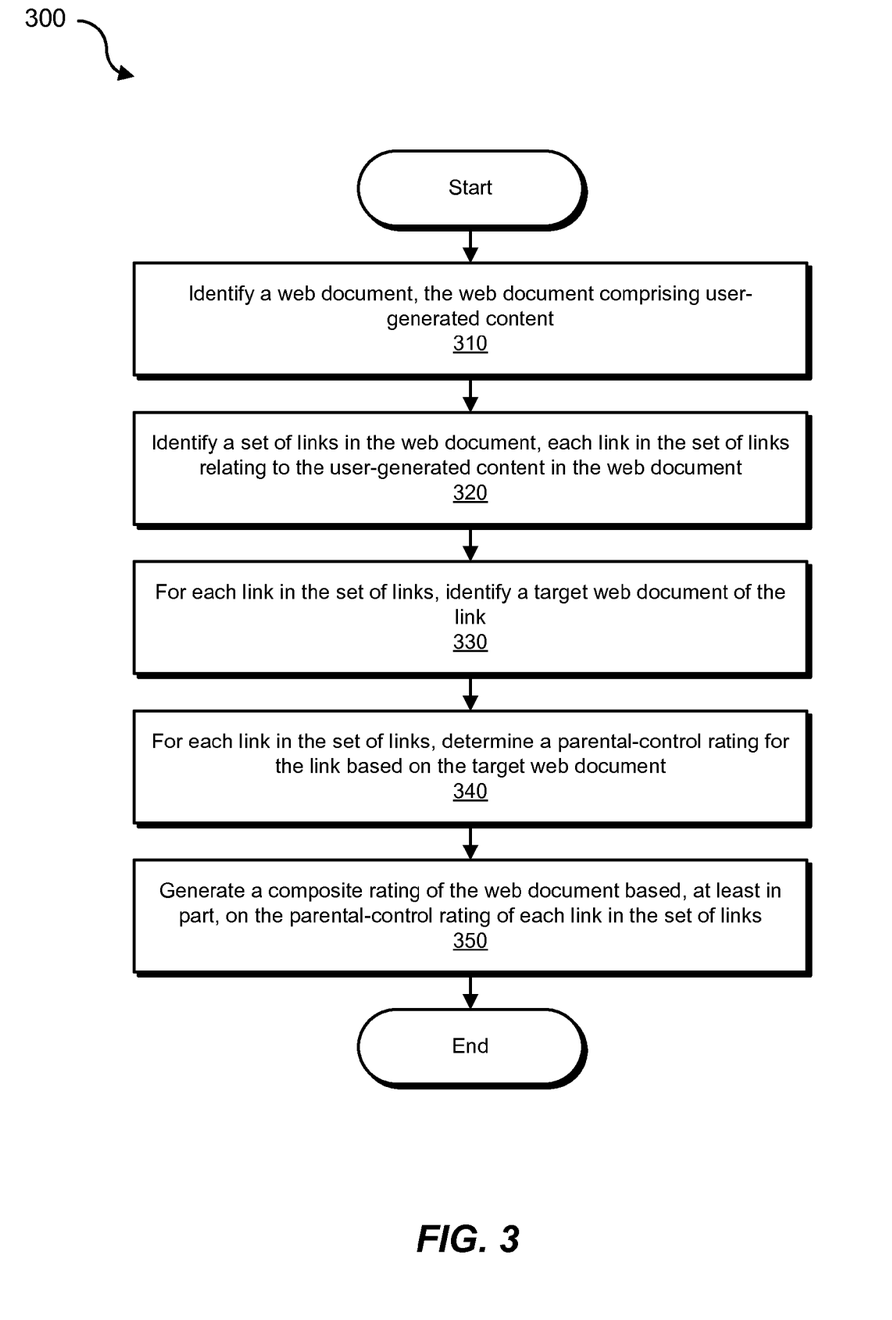
FIG. 3 is a flow diagram of an exemplary method for enforcing parental-control policies on user-generated content.

FIG. 3 illustrates an exemplary method 300 for enforcing parental-control policies on user-generated content. In some embodiments, the steps in FIG. 3 may be performed by one or more of modules 110. For example, at step 310 detection module 112 in FIG. 1 may identify a web document that includes user-generated content. A web document may include a web page (i.e., an HTML document) and/or any other electronic document or file that a user may access across a network. Detection module 112 may identify the web document in any suitable manner, such as by detecting an attempt to access the web document and determining that the web document includes user-generated content.

Detection module 112 may determine that the web document includes user-generated content in any suitable manner. For example, detection module 112 may determine that the web document includes user-generated content by determining that the web document is located on a website known for user-generated content (e.g., FACEBOOK.COM or BLOGGER.COM). Detection module 112 may determine that the web document is located on a website known for user-generated content by, for instance, parsing the uniform resource locator (URL) of the web document. For example, if the URL of the web document is http://www.facebook.com/profile.php?id=1234567890, detection module 112 may parse the domain facebook.com from the URL and determine that the web document is located on FACEBOOK.COM, a website known for user-generated content.

Detection module 112 may also determine that the web document includes user-generated content by determining that the web document includes a framework for user-generated content (e.g., WORDPRESS or BLOGGER). For example, detection module 112 may parse the web document and determine that the arrangement of the page elements matches a known publishing framework. Additionally or alternatively, detection module 112 may parse the web document and determine that that one or more of the page elements matches an element known to typically include user-generated content.

Returning to FIG. 3, at step 320 detection module 112 may identify a set of links in the web document, where each link in the set of links relates to the user-generated content in the web document. For example, detection module 112 may parse the web document for links. Detection module 112 may exclude from the set of links those links that do not relate to the user-generated content. For instance, detection module 112 may exclude links that pertain to the web site of the web document in general rather than the web document in particular, generic advertisement links, and/or any other links that do not relate to the user-generated content in the web document.

In order to identify only those links which relate to the user-generated content in the web document, detection module 112 may determine a relationship between the link and the user-generated content. The relationship between the link and the user-generated content may exist in a variety of contexts. For example, the relationship between the link and the user-generated content may exist where the user-generated content includes the link, such as a link in a blog post. The relationship between the link and the user-generated content may also exist where link was generated in reference to the user-generated content, such as a related-video link on YOUTUBE.COM may be generated in reference to the original video.

Detection module 112 may also determine a relationship between the link and the user-generated content by determining that the link refers to a content-generating user. For example, the link may point to a profile page of a user on a blogging website, a social network, and/or any other user-generated content platform. After detection module 112 determines that the link refers to a content-generating user, detection module 112 may determine that content in the web document corresponds to the content-generating user. For example, a comment on a blog post may include a link to the author of the comment. Detection module 112 may determine that the comment corresponds to the author.

As will be described in further detail below, rating module 114 may enforce a parental-control policy by blocking a part of the web document if the part of the web document is related to a link which is rated as inappropriate.

A link may include any element of the web document that connects the web document to content outside the web document. For example, the link may include a hyperlink. The link may connect the web document to a static web document or to a dynamically-created web document. A set of links may include one or more links.

Returning to FIG. 3, at step 330 the detection module may identify a target web document of each link in the set of links. For example, the detection module may identify the target web document of a link by retrieving the target web document from a URL provided in the link. The detection module may also identify the target web document by any other suitable method.

At step 340, the rating module may determine a parental-control rating for each link in the set of links. The rating module may base the parental-control rating on the target web document of a link. The rating module may determine the parental-control rating of the link in a variety of ways. For example, the rating module may determine the parental-control rating of the link by determining a URL or site-based category rating of the target web document. For instance, if the target web document is located on a website known for violence, the rating module may rate the link to the target web document accordingly.

The rating module may also determine the parental-control rating of the link recursively. For example, if the target web document contains user-generated content, the rating module may rate the links in the target web document to determine a rating for the link to the target web document. The rating module may also keep track of its recursion in order to avoid infinite recursion due to cross-linked content. For example, the rating module may identify a fixed number of recursion levels. Once the rating module reaches the fixed number of recursion levels, the rating module may go no deeper. Additionally or alternatively, the rating module may keep track of web documents and/or links that it has examined in order to avoid cross-linked recursion. For example, the rating module may record the URL of each link it examines and/or a hash or other identifying feature of each target web document to which the link points. If the rating module encounters the link or target web document again in its recursive rating, the rating module may not descend further into examination of the link or target web document.

Returning to FIG. 3, after determining a parental-control rating for each link in the set of links, at step 350 rating module 114 may generate a composite rating of the web document based, at least in part, on the parental-control rating of each link in the set of links. Rating module 114 may generate the composite rating of the web document by any suitable method. For example, rating module 114 may average the ratings of the links in the set of links or use the rating of the most inappropriate link in the set of links as the composite rating.

Rating module 114 may additionally or alternatively use other information to determine the composite rating. For example, as described above for step 320, detection module 112 may determine the relationship between the link and the user-generated content. Once detection module 112 has determined the relationship between the link and the user-generated content, rating module 114 may determine a reputation rating for the content-generating user. The reputation rating may include any rating that may help to determine the appropriateness of content produced by or connected with the content-generating user. Rating module 114 may determine the reputation rating for the content-generating user in any suitable manner. For example, rating module 114 may examine the content that the content-generating user has created. After rating module 114 has determined the reputation rating for the content-generating user, rating module 114 may generate the composite rating for the web document based on the reputation rating for the content-generating user.

Rating module 114 may also generate the composite rating based on incoming links. For example, rating module 114 may identify an incoming link that points to the web document, identify a source of the incoming link, and determine a parental-control rating for the source of the incoming link. Rating module 114 may determine a parental-control rating for the source of the incoming link by a variety of means, such as a URL or site-based category rating as described earlier, or, if the source of the incoming link includes user-generated content, the recursive method of rating user-generated content as described earlier. In some embodiments, the composite rating may be based on one or more incoming link ratings, one or more outgoing link ratings, one or more reputation ratings, and/or any combination of these ratings and/or other information.

Rating module 114 may further include any other suitable criteria to generate the composite rating. For example, rating module 114 may consider keywords in the web document, community ratings of the web document, and/or analysis of images, videos, or other content embedded in the web document.

After generating the composite rating of the web document, rating module 114 may enforce a parental-control policy based on the composite rating. Rating module 114 may enforce the parental-control policy in any suitable manner. For example, rating module 114 may block access to the web document. Alternatively, as mentioned earlier, rating module 114 may also enforce the parental-control policy by identifying a suspect part of the web document related to a link in the set of links and blocking access to that suspect part. The suspect part of the web document may include a comment, an image, a video, and/or a hyperlink.

Rating module 114 may also enforce the parental-control policy by identifying an attempt to submit user-generated content and blocking the attempt. For example, a child may create user-generated content, such as a blog post, with links to inappropriate content. The child may use a web form to draft and submit the blog post. Detection module 112 and rating module 114 may treat the web document with the web form as a web document with user-generated content, determine that the web document violates a parental-control policy, and block the child from submitting the blog post.

One or more of the steps of the method for enforcing parental-control policies on user-generated content described above may transform a visual display device into a different state. For example, with the transformation, the visual display device may allow a parent to view, manipulate, and enforce parental-control policies on user-generated content.

Figure 4:
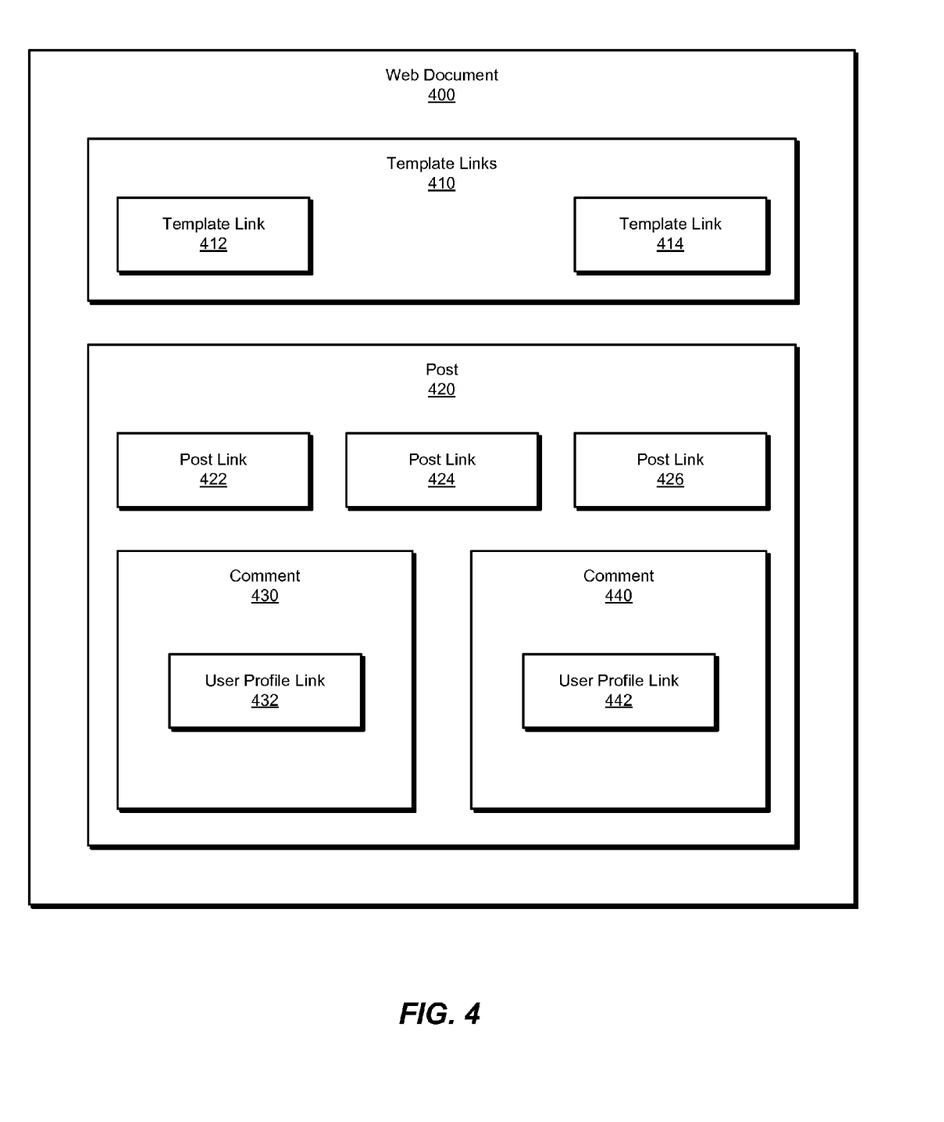
FIG. 4 is an exemplary web document to which the embodiments described and/or illustrated herein may be applied.

For the sake of clarity, and by way of example only, FIG. 4 illustrates an exemplary web document 400 to which the embodiments described and/or illustrated herein may be applied. Web document 400 may include template links 410. Template links may include links unrelated to user-generated content, such as template link 412 and template link 414. Web document 400 may also include post 420. Post 420 may include user-generated content. Post 420 may include post links 422, 424, and 426. Post 420 may also include comment 430 with user profile link 432 and comment 440 with user profile link 442.

Detection module 112 may identify web document 400 as a web document with user-generated content. For example, detection module 112 may determine that web document 400 follows the format of a known blog publishing framework. After identifying web document 400, detection module 112 may identify a set of links in web document 400 that relate to the user-generated content in web document 400. For example, detection module 112 may identify post links 422, 424, and 426 as relating to post 420. Detection module 112 may further identify user profile link 432 as relating to comment 430 and user profile link 442 as relating to comment 440. Detection module 112 may exclude template links 410 from the set of links, as template links 410 may not relate to any user-generated content. After identifying the set of links in web document 400, detection module 112 may identify a target web document of each link.

Once detection module 112 identifies a target web document of each link in the set of links, rating module 114 may determine a parental-control rating for each link based on the target web document. For example, rating module 114 may determine that each of post links 422, 424, and 426 are appropriate. Detection module 114 may determine, however, that user profile link 432 and user profile link 442 are inappropriate. In some embodiments, rating module 114 may generate a composite rating based on post links 422, 424, and 426 and user profile links 432 and 442. The composite rating may indicate that web document 400 is inappropriate. Rating module 114 may then enforce a parental-control policy on web document 400 by, for example, blocking access to web document 400.

In other embodiments, rating module 114 may determine that web document 400 would have an appropriate composite rating after the exclusion of user profile links 432 and 442. In such embodiments, rating module 114 may enforce the parental-control policy by blocking a user (e.g., a child) from viewing user profile links 432 and 442 in web document 400. Rating module 114 may further determine that comments 430 and 440 are suspect due to their relationship with user profile links 432 and 442. Rating module 114 may accordingly also exclude comments 430 and 440 from web document 400.

Figure 5:
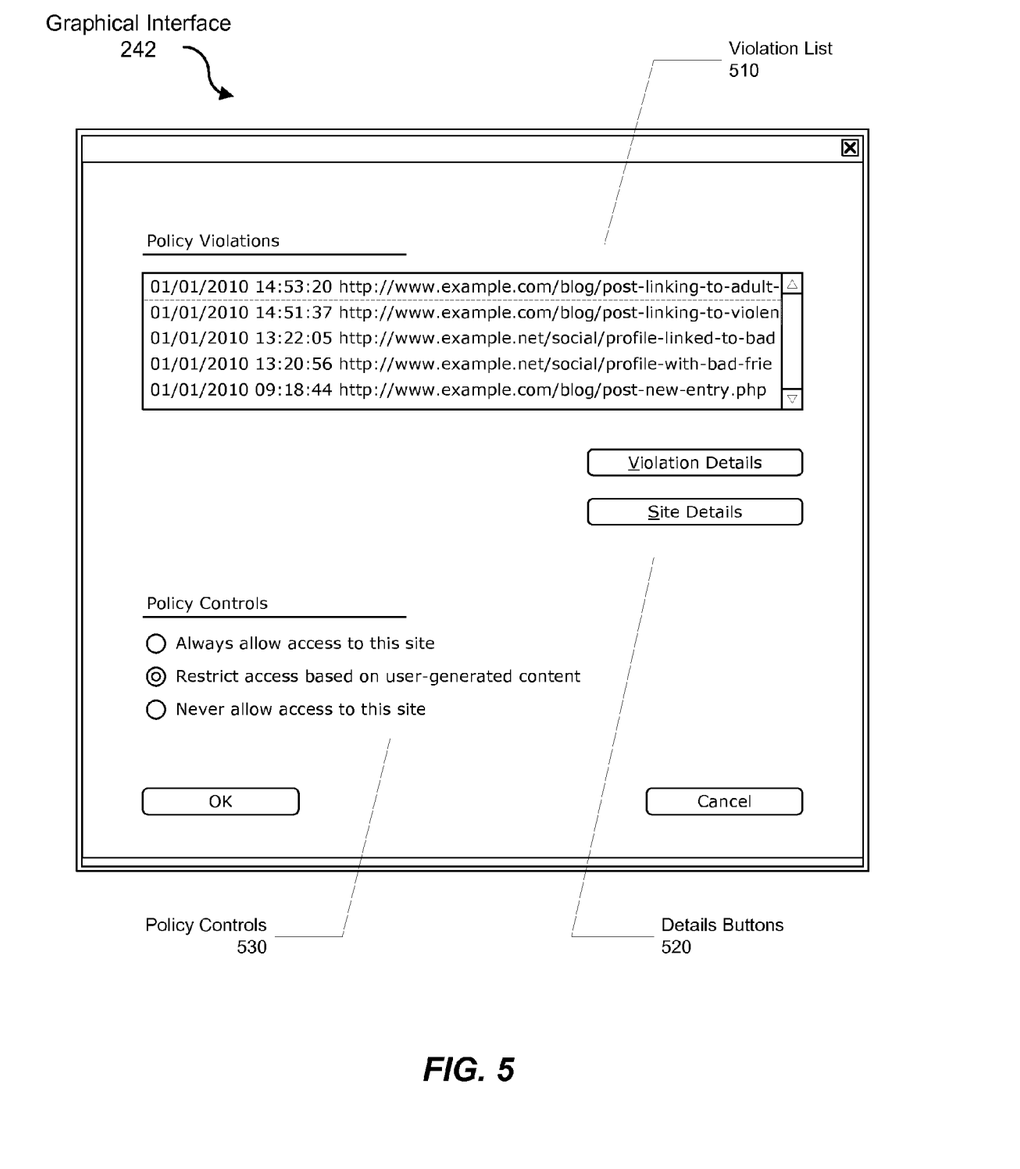
FIG. 5 is an exemplary graphical interface for enforcing parental-control policies on user-generated content.

FIG. 5 illustrates an exemplary graphical interface 242 for enforcing parental-control policies on user-generated content. Graphical interface 242 may include violation list 510, details buttons 520, and policy controls 530. Violation list 510 may include attempts to violate a parental-control policy through user-generated content. Violation list 510 may include, for example, the date and/or time of the attempted violation and the URL of the web document. A parent may select one of the attempted policy violations of violation list 510 for further action. Details buttons 520 may allow the parent to inspect the details of the selected violation from violation list 510. For example, the parent may view which parental-control policy triggered the violation and which links in the offending web document were responsible for the violation. The parent may also view details about the website on which the attempted violation occurred. Policy controls 530 may allow the parent to change the access policy for the website of the attempted violation. For example, the parent may determine, after viewing the details of the violation, that access to content from a given website should be allowed, that access to content from the website should always be blocked, or that access to content should depend on analysis of the particular user-generated content.

Figure 6:
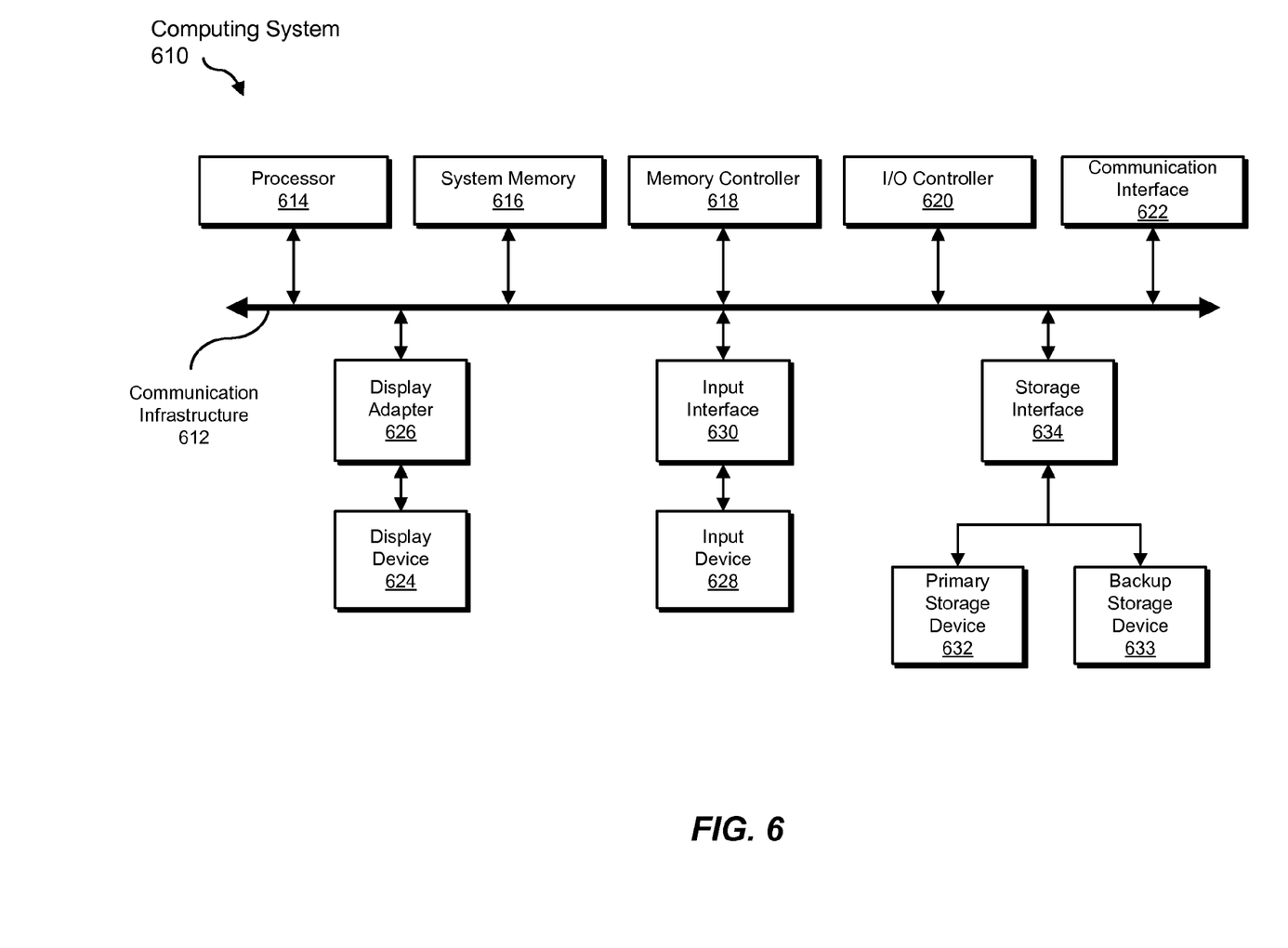
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, generating, enforcing, blocking, and/or detecting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, determining, generating, enforcing, blocking, and/or detecting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, determining, generating, enforcing, blocking, and/or detecting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, generating, enforcing, blocking, and/or detecting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, generating, enforcing, blocking, and/or detecting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, determining, generating, enforcing, blocking, and/or detecting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
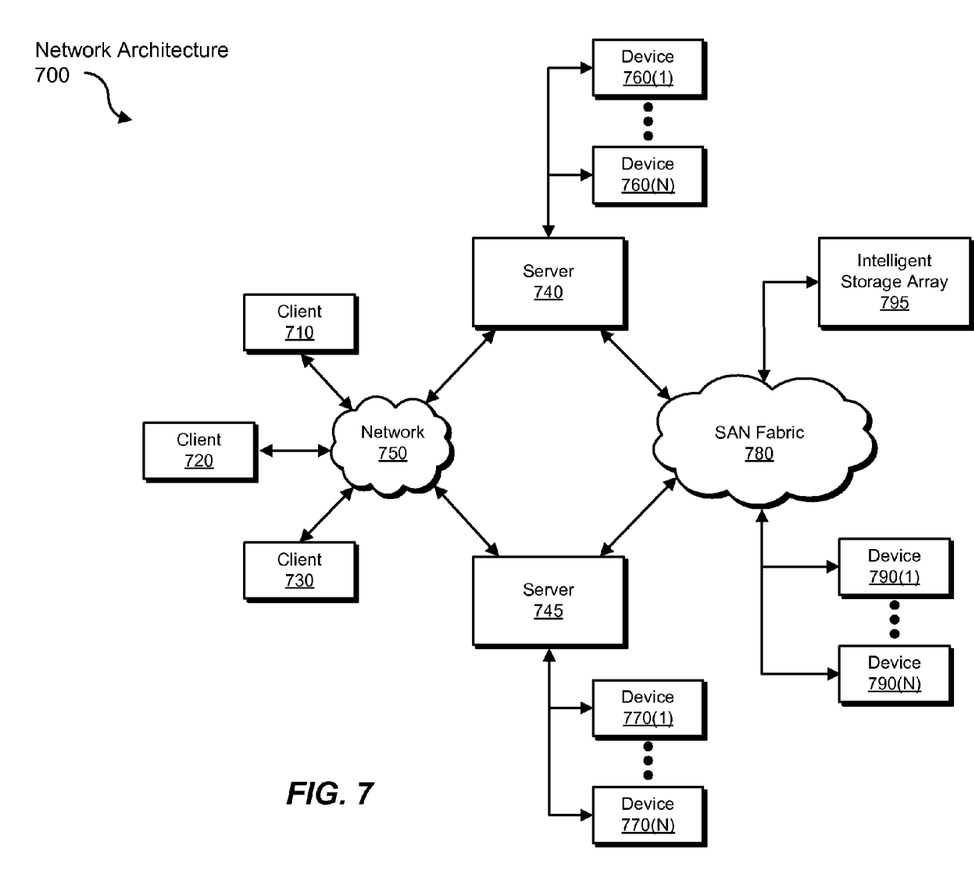
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, generating, enforcing, blocking, and/or detecting steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of the exemplary methods described herein. For example, a computing system (e.g., computing system 610 and/or one or more of the components of network architecture 700) may perform a computer-implemented method for enforcing parental-control policies on user-generated content. The computing system may identify a web document with user-generated content. The computing system may further identify a set of links in the web document, where each link relates to the user-generated content in the web document. The computing system may then identify a target web document for each link in the set of links and determine a parental-control rating, based on the target web document, for each link in the set of links. The computing system may then generate a composite rating of the web document based, at least in part, on the parental-control rating of each link in the set of links. According to some embodiments, the computing system may enforce a parental-control policy based on the composite rating.

In some embodiments, enforcing the parental-control policy may comprise blocking access to the web document. According to some embodiments, enforcing the parental-control policy may comprise identifying a suspect part of the web document related to the link and blocking access to the suspect part. In some further embodiments, the suspect part of the web document may comprise a comment, an image, a video, and/or a hyperlink. In some embodiments, enforcing the parental-control policy may comprise identifying an attempt to submit user-generated content and blocking the attempt to submit user-generated content.

In some embodiments, the computing system may determine a relationship between the link and the user-generated content. According to some embodiments, determining the relationship between the link and the user-generated content may comprise determining that the link refers to a content-generating user and determining that content in the web document corresponds to the content-generating user. According to some further embodiments, generating the composite rating may further comprise determining a reputation rating for the content-generating user and generating the composite rating based on the reputation rating for the content-generating user.

In certain embodiments, generating the composite rating may further comprise identifying an incoming link that points to the web document, identifying a source of the incoming link, determining a parental-control rating for the source of the incoming link, and generating the composite rating based on the parental-control rating for the source of the incoming link.

According to some embodiments, identifying the web document may comprise detecting an attempt to access the web document and determining that the web document includes user-generated content. In some further embodiments, determining that the web document includes user-generated content may comprise determining that the web document is located on a website known for user-generated content and/or determining that the web document comprises a framework for user-generated content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for enforcing parental-control policies on user-generated content, at least a portion of the method being performed by a computing system comprising at least one processor, the method comprising:
   identifying a web document, the web document comprising user-generated content that is not authored by an entity that publishes and/or hosts the web document;
   identifying a subset of links in the web document that are related to the user-generated content in the web document by:

1) parsing the web document to identify a set of links in the web document;
2) identifying, within the set of links, one or more links which are related to the user-generated content by determining that the one or more links refer to the user-generated content, by determining that the user-generated content includes the one or more links, and/or by determining that the one or more links refer to a content-generating user responsible for generating the user-generated content;
3) excluding, from the subset of links, one or more links identified in the set of links that were not determined to be related to the user-generated content in the web document;
4) including, in the subset of links, the one or more links that were determined to be related to the user-generated content in the web document;

for each link in the subset of links:
   identifying a target web document of the link;
   determining a parental-control rating for the link based on the target web document;
generating a composite rating of the web document based, at least in part, on the parental-control rating of each link in the subset of links; and
enforcing the parental control policy based on the composite rating of the web document.

2. The computer-implemented method of claim 1, wherein the enforcing the parental-control policy based on the composite rating further comprises:
   identifying a suspect part of the web document related to the link;
   blocking access to only the suspect part of the web document.

3. The computer-implemented method of claim 2, wherein identifying the web document comprises:
   detecting an attempt to access the web document;
   determining that the web document includes user-generated content by determining that the web document includes a framework for user-generated content.

4. The computer-implemented method of claim 3, wherein determining that the web document includes the framework for user-generated content comprises:
   parsing the web document to identify page elements on the web document;
   determining that the page elements on the web document and/or an arrangement of the page elements on the web document are indicative of a publishing framework for user-generated content.

5. The computer-implemented method of claim 4, wherein excluding, from the subset of links, the one or more links identified in the set of links that were not determined to be related to the user-generated content in the web document comprises:
   excluding, from the subset of links, one or more generic advertisement links.

6. The computer-implemented method of claim 1, wherein generating the composite rating further comprises:
   determining a reputation rating for the content-generating user;
   generating the composite rating based on the reputation rating for the content-generating user.

7. The computer-implemented method of claim 1, wherein identifying the web document comprises:
   detecting an attempt to access the web document;
   determining that the web document includes user-generated content.

8. The computer-implemented method of claim 7, wherein determining that the web document includes user-generated content comprises:
   identifying a uniform resource locator of the web document;
   parsing the uniform resource locator to identify a domain associated with the web document;
   determining, based on the domain associated with the web document, that the web document is located on a website that hosts user-generated content.

9. A system for enforcing parental-control policies on user-generated content comprising:
   a detection module programmed to:
      identify a web document, the web document comprising user-generated content that is not authored by an entity that publishes and/or hosts the web document;
      identify a subset of links in the web document that are related to the user-generated content in the web document by:
         1) parsing the web document to identify a set of links in the web document;
         2) identifying, within the set of links, one or more links which are related to the user-generated content by determining that the one or more links refer to the user-generated content, by determining that the user-generated content includes the one or more links, and/or by determining that the one or more links refer to a content-generating user responsible for generating the user-generated content;
         3) excluding, from the subset of links, one or more links identified in the set of links that were not determined to be related to the user-generated content in the web document;
         4) including, in the subset of links, the one or more links that were determined to be related to the user-generated content in the web document;
   a rating module programmed to:
      for each link in the subset of links:
         identify a target web document of the link;
         determine a parental-control rating for the link based on the target web document;
      generate a composite rating of the web document based, at least in part, on the parental-control rating of each link in the subset of links;
      enforce the parental control policy based on the composite rating of the web document;
   one or more processors configured to execute the detection module and the rating module.

10. The system of claim 9, wherein the rating module enforces the parental-control policy by blocking access to the web document.

11. The system of claim 9, wherein the rating module enforces the parental-control policy by:
   identifying a suspect part of the web document related to the link;
   blocking access to the suspect part.

12. The system of claim 11, wherein the suspect part of the web document comprises at least one of:
   a comment;
   an image;
   a video;
   a hyperlink.

13. The system of claim 9, wherein the rating module enforces the parental-control policy by:
   identifying an attempt to submit user-generated content;
   blocking the attempt to submit user-generated content.

14. The system of claim 9, wherein the rating module further generates the composite rating by:
- identifying an incoming link that points to the web document;
- identifying a source of the incoming link;
- determining a parental-control rating for the source of the incoming link;
- generating the composite rating based on the parental-control rating for the source of the incoming link.

15. A non-transitory computer-readable-storage medium comprising one or more computer-executable instructions that, when executed by a computing device, cause the computing device to:
- identify a web document, the web document comprising user-generated content that is not authored by an entity that publishes and/or hosts the web document;
- identify a subset of links in the web document that are related to the user-generated content in the web document by:
  1) parsing the web document to identify a set of links in the web document;
  2) identifying, within the set of links, one or more links which are related to the user-generated content by determining that the one or more links refer to the user-generated content, by determining that the user-generated content includes the one or more links, and/or by determining that the one or more links refer to a content-generating user responsible for generating the user-generated content;
  3) excluding, from the subset of links, one or more links identified in the set of links that were not determined to be related to the user-generated content in the web document;
  4) including, in the subset of links, the one or more links that were determined to be related to the user-generated content in the web document;
- for each link in the subset of links:
  - identify a target web document of the link;
  - determine a parental-control rating for the link based on the target web document;
- generate a composite rating based, at least in part, on the parental-control rating of each link in the subset of links; and
- enforce the parental control policy based on the composite rating of the web document.

* * * * *